United States Patent [19]

Kornmann et al.

[11] Patent Number: 4,479,891

[45] Date of Patent: Oct. 30, 1984

[54] PROCESS FOR MANUFACTURING AN ANTI-CORROSION PAINT AND THE PAINT RESULTING FROM THAT PROCESS

[75] Inventors: Michel Kornmann, Grand-Lancy; Yehuda Talmor, Geneva, both of Switzerland

[73] Assignee: Battelle Development Corporation, Columbus, Ohio

[21] Appl. No.: 502,206

[22] Filed: Jun. 8, 1983

[30] Foreign Application Priority Data

Jun. 10, 1982 [CH] Switzerland ............... 3581/82

[51] Int. Cl.$^3$ ................... C08K 3/32; C08K 3/10
[52] U.S. Cl. ................... 252/512; 523/200; 523/442; 523/515; 524/440
[58] Field of Search .......... 523/200, 442, 515; 524/440; 252/512, 389; 106/1.25, 14.39, 14.44

[56] References Cited

U.S. PATENT DOCUMENTS 3,671,331 6/1972 Malkin et al. ............... 428/640
3,687,738 8/1972 Malkin ......................... 148/6.2

Primary Examiner—Lewis T. Jacobs
Attorney, Agent, or Firm—Barry S. Bissell; Benjamin Mieliulis

[57] ABSTRACT

This manufacturing process consists in forming a passivation layer on manganese pigments and thereafter mixing the latter with a resin to form a paint. This paint is electrically conductive since the passivation layer is based on chromate, Mn/Fe phosphate or Zn phosphate. These pigments preferably have a degree of purity equal to or greater than 99.9%.

5 Claims, No Drawings

PROCESS FOR MANUFACTURING AN ANTI-CORROSION PAINT AND THE PAINT RESULTING FROM THAT PROCESS

The present invention relates to a process for manufacturing an anti-corrosion cathodic protection paint comprising manganese pigments and to a paint obtained according to this process.

In commerce there are already steel sheets protected against corrosion by a zinc-based primer layer to provide cathodic protection of the metal substrate by its own anodic dissolution, as in the case of zinc-coated sheets. Sheets of this type are in particular used in the car industry, in particular since a primer layer of this type is conductive and enables the sheets to be resistance welded and since one or more finishing coats of paint may be applied to this primer layer.

Nevertheless, the presence of a zinc-based primer layer is a great disadvantage since zinc is not included in the composition of steel. As a result of this fact scrap steel with a primer layer of this type loses the greatest part of its value when it is remelted. In the car industry, for example, scrap represents approximately 30% of the sheet steel used, so that the loss is considerable. Another disadvantage found with zinc-coated sheets is due to the spot-welding to which these sheets are subjected. It is noted that there is increased wear of the welding electrodes and the production of dangerous fumes.

It has already been proposed to use metallic manganese pigments in an anti-corrosion paint, as may be seen from the article "Metallic manganese as an anticorrosive pigment for paint" by G. L. E. Wild in Paint Technology Vol. 30 no. 8, August 1966. It has been shown, in particular, that a paint of this type provides cathodic protection of the metal sheet in the same way as a zinc-based paint and is also electrically conductive, which enables resistance welding to be performed. The duration of this type of protection evidently depends on the duration of the life of the Mn pigments. These pigments are relatively sensitive with respect to a harsh environment, such that their useful life depends not only on their anodic dissolution providing protection of the sheet, but also on the degradation of these pigments by the environment itself which is far greater than that of zinc pigments.

As is known, manganese is normally included in the composition of steel so that, in contrast to sheets coated with a zinc-based primer coat, scrap of sheets coated with a manganese-based primer layer may be recycled easily in a recovery process in order to produce good quality steel, which would considerably increase the value of this scrap. Despite the disadvantages of zinc paint there is no sheet metal coated with a manganese primer layer on the market owing to the sensitivity of the pigments themselves with respect to the environment.

It has been already proposed in U.S. Pat. Nos. 3,671,331 and 3,687,738 to use resinless coating compositions for protecting a metal substrate against corrosion, such compositions comprising, before curing, a liquid medium mixture of chromic acid, a reducing agent and 200–1000 g/l of this liquid medium of manganese powder. The chromic acid of this mixture causes a chromatation of the manganese particles, this being presumably before hardening. However, it should be remarked that such resinless composition is not a paint but rather a primer layer; in the case of a paint whose binder is a resin, it would not be possible to provide the formation of a layer of chromate or phosphate on the manganese pigments while forming such a mixture.

The aim of the present invention is to overcome the disadvantages of anti-corrosion paints on the basis of manganese pigments.

For this purpose the present invention relates to a process for manufacturing an anti-corrosion paint according to claim 1.

The preparation of manganese pigments to be mixed with a resin to form the anti-corrosion paint firstly consists in selecting very pure manganese, in principle equal to or greater than 99.9%, in so far as the purer the manganese is, the less liable it is to degradation by the environment. This manganese is in the form of flakes and the first operation consists of reducing it to a powder in a grinder. The average grain size of the powder obtained in this way varies between 1.8 and 2.4$\mu$.

The passivation layer formed on these grains of powder may be obtained in different phosphating baths followed by chromate rinsing baths and a drying process, or solely by chromate baths.

The passivation layers obtained in this way are not in principle electrically conductive. It is therefore important to select the treatment period so that the thickness of the layer formed around the particle of powder is sufficient to ensure its passivation whilst remaining relatively thin in order to allow electrical conduction by the "tunnel" effect.

Two types of phosphating baths were used, one bath I of Zn phosphate+$H_2O$ (Hydrolite 21.02 of Angewandte Chemie AG) and one bath II of Mn/Fe phosphate+$H_2O$ (Hydrolite 26.51 of the same supplier).

The chromate rinsing bath was formed either of an aqueous solution in the case of bath III or of a non-aqueous isopropylene solution in the case of bath IV. After drying the powders were subjected to an electrical conductivity test which proved positive in the majority of cases. Subsequently these powders were mixed in a two component epoxy resin supplied by Jallut, of the Super Jaltonit Incolor type, with 95% by weight of pigment.

Before applying the paints obtained with these pigments to sheets of steel these sheets were subjected to the following pre-treatment:
 degreasing in a tetrachloroethylene bath at ambient temperature;
 abrasive cleaning so as to remove the oxide layers;
 exposing for ten minutes to chloroethylene vapours;
 phosphating in a standard Zn phosphate bath (Hydrolite 21.02) supplied by Angewandte Chemie AG.

The layer obtained has a mass of approximately 3 g/$m^2$ corresponding to a thickness of the order of 1$\mu$.

The rinsing was performed in a standard chromate bath containing approximately 60% chromic acid. The bath used is sold under the name Ampassive by the firm Amstutz Product AG.

The different paints tested were applied to the metal sheets prepared in this way in accordance with the ASTM D 823-53 standard. Immediately after this paint with Mn pigments had been applied a diluted solution of the same resin without pigment was applied to the surface so as to obtain samples similar to the real conditions of the painted products. The resin was subsequently polymerized for approximately two hours in a furnace at 180° C. In accordance with this method it was possible to obtain a primer layer approximately 12$\mu$ thick and a final layer, the thickness of which varies between 30 and 40μ. In the following different examples of manganese powder passivation will be given, after which the results obtained with the samples of metal sheets coated with paints based on these powders will be examined.

EXAMPLE 1

99% Mn powder, bath IV, duration 25'.

EXAMPLE 2

99% Mn powder, bath III, duration 3'30".

EXAMPLE 3

99% Mn powder, bath I at 90° C. duration 5', bath III duration 2'.

EXAMPLE 4

99% Mn powder, bath II at 70° C. duration 5', bath III duration 2'.

EXAMPLE 5

99% Mn powder, bath II at ambient temperature duration 1 hour, bath IV duration 15'.

EXAMPLE 6

99.9% Mn powder, bath II at ambient temperature duration 1'30", bath III duration 1'40".

EXAMPLE 7

99.9% Mn powder, bath I at ambient temperature duration 1'30", bath III duration 2'20".

These samples were then tested in a saline mist chamber employing a 5% aqueous solution of NaCl at 35° C. By way of comparison, a sample coated with Zn pigment paint was subjected to the same treatment. This sample was coated with non-pigmented epoxy resin to simulate the same conditions as the samples coated with a Mn based primer layer. The painted surface of all the samples was scratched to the depth of the metal substrate in order to perform this corrosion test. After 300 hours of spraying of the saline solution it was noted that all the samples were corroded at the location of the scratches, including the sample coated with Zn paint.

As regards the sample coated with zinc paint, large areas beyond the scratches were highly pitted. It was observed that such degradation was greated reduced on some of the samples coated with passivated Mn pigment paint.

The best behaviour was observed on the samples corresponding to the Mn pigments of examples 1, 3, 4 the other samples giving satisfactory results.

These comparative tests show that resistance to corrosion is clearly improved in the case of the paint which is the subject of the invention with respect to a paint in which the passivated Mn pigments have been replaced by Zn pigments, this resistance being comparable to that of commercial "primer" paints.

We claim:

1. Process for manufacturing an anti-corrosion paint providing cathodic protection and whose binder is a resin characterized in forming a passivation layer of phosphate and/or chromate salts on the surface of manganese pigments and thereafter incorporating said pigments in said resin.

2. The paint obtained by carrying out the process of claim 1, characterized in that it is electrically conductive.

3. An electrically conductive anti-corrosion paint providing cathodic protection comprising a binder resin and a manganese powder pigment, said manganese powder having a passivation layer selected from chromate based, Mn/Fe phosphate based, or Zn phosphate based layers.

4. An electrically conductive anti-corrosion paint providing cathodic protection comprising
    (a) a manganese pigment powder;
    (b) a passivation layer on the manganese powder, said passivation layer consisting of a phosphate and/or chromate salt; and,
    (c) a binder resin.

5. The claim according to claim 4 wherein the phosphate salt is selected from the group consisting of zinc phosphate, manganese phosphate and iron phosphate.

* * * * *